US006707989B1

(12) United States Patent
Ka'ahumanu

(10) Patent No.: US 6,707,989 B1
(45) Date of Patent: Mar. 16, 2004

(54) METHOD AND APPARATUS FOR PROVIDING BAGGAGE IDENTIFICATION TAGS

(76) Inventor: Laki Po'Maikai Ka'ahumanu, 590 Luakini St., Lahaina, Maui, HI (US) 96761

( * ) Notice: Subject to any disclaimer, the term of this patent is extended or adjusted under 35 U.S.C. 154(b) by 2 days.

(21) Appl. No.: 10/438,528

(22) Filed: May 14, 2003

(51) Int. Cl.$^{7}$ ................................................ G03B 15/00

(52) U.S. Cl. ............................. 396/2; 396/429; 348/61; 40/6; 283/80; 235/384

(58) Field of Search ..................... 396/2, 429; 235/375, 235/384; 283/80; 40/299.01, 6; 348/61

(56) References Cited

U.S. PATENT DOCUMENTS

| | | | |
|---|---|---|---|
| 4,821,118 | A | 4/1989 | Lafreniere |
| 5,051,565 | A | 9/1991 | Wolfram |
| 5,635,981 | A | 6/1997 | Ribacoff |
| 5,642,160 | A | 6/1997 | Bennett |
| 5,838,814 | A | 11/1998 | Moore |
| 5,900,307 | A | 5/1999 | Barcikowski |
| 5,920,053 | A | 7/1999 | DeBrouse |
| 6,085,195 | A | 7/2000 | Hoyt et al. |
| 6,106,020 | A | 8/2000 | Leef et al. |
| 6,137,895 | A | 10/2000 | Al-Sheikh |
| 6,298,197 | B1 | 10/2001 | Wain et al. |
| 6,364,365 | B1 | 4/2002 | Caplan |
| 6,381,891 | B1 | 5/2002 | Hazel |
| 6,519,596 | B1 | 2/2003 | Hoyt et al. |
| 6,522,253 | B1 | 2/2003 | Saltus |
| 6,523,034 | B1 | 2/2003 | Hoyt et al. |
| 2002/0126878 | A1 | 9/2002 | Al-Sheikh |

*Primary Examiner*—David M. Gray
(74) *Attorney, Agent, or Firm*—Clayton, Howarth & Cannon, P.C.

(57) ABSTRACT

A booth for providing baggage identification tags is disclosed. The booth provides a mechanism for taking a picture of a person and placing the picture on an identification tag. The booth also allows the person to enter identification information such as a name and address to be placed on the identification tag in bold print for easy identification. Also, the identification tag may be provided with a colorful, eye-catching design selected for easy identification. The identification tag may be provided with a durable strap for attaching the identification tag to baggage. The booth may be placed at locations where baggage is used, such as airports, so that the identification tags may be conveniently obtained and so that the security of the baggage may be enhanced.

30 Claims, 3 Drawing Sheets

METHOD AND APPARATUS FOR PROVIDING BAGGAGE IDENTIFICATION TAGS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. The Field of the Invention

The present invention relates generally to vending devices and methods, and more particularly, but not necessarily entirely, to a method and apparatus for providing baggage identification tags for travelers.

2. Description of Related Art

It is common practice to provide identification tags for baggage. Baggage identification tags are useful for travelers to mark their baggage with information to assist in indicating ownership of the baggage and to provide information to allow the baggage to be returned to the owner in the event it becomes misplaced. Transportation terminals, such as airports, commonly require the baggage to be separated from the owner during transit or while passing through security points, thereby increasing the importance of a mechanism to properly identify the baggage.

Complimentary identification tags are commonly provided at transportation facilities such as airports. A traveler is required to write identifying information on the tags and attach the tags to the baggage prior to conveying the baggage to transportation personnel. The complimentary tags provided at the transportation facilities are often constructed of inexpensive material, such as paper and a thin elastic attachment strap, and are not configured for repeated use. Also, it is often difficult and time consuming for a traveler with multiple pieces of baggage to write the information on multiple tags. Moreover, the prior art identification tags may not be easily recognized, requiring individuals to look closely at the writing on the tags to distinguish one tag from another.

Other higher quality types of identification tags for baggage are available at retail establishments. However, the baggage identification tags are produced in a generic form and are not customized with a photo of the owner or other distinguishing information. Thus, additional proof may be required to verify that the identification tags belong to the owner. Moreover, the identification tags are not conveniently purchased and require the assistance of sales personnel to assist in purchasing the identification tags. Thus, the identification tags may not be available during all the hours a traveler may have need to purchase an identification tag.

Also, U.S. Pat. No. 5,920,053 granted Jul. 6, 1999 to DeBrouse, discloses a passenger identification and baggage control system. A baggage tag is disclosed having a photo and other information used for transportation. However, the baggage tag is created by an airline agent rather than the traveler. Thus, the tag producing system does not allow a traveler to create a customized tag, and use of the tag producing system involves multiple people. Moreover, the baggage tag includes information, such as the date and flight number, and is therefore only intended for a single use.

Similarly, U.S. patent application Publication No. U.S. 2002/0126878 discloses a baggage tag having a picture of the traveler placed thereon for identification purposes. However, the method for providing the baggage tag involves the assistance of clerks and, the baggage tag is only intended for a single use.

Photo booths are known in the art for allowing a person to take a picture of him or herself, and quickly obtaining a copy of the picture. An example of such a photo booth is disclosed in U.S. Pat. No. 6,298,197 to Wain et al., granted Oct. 2, 2001, which is hereby incorporated herein by reference in its entirety. The photo booth disclosed in U.S. Pat. No. 6,298,197 discloses an automatic photo booth with an electronic imaging camera. However, the photo booth does not provide a mechanism for entering customized identification information, such as a name and address, to be placed on an identification tag. Moreover, the photo booth does not disclose a mechanism for dispensing identification tags or straps for attaching the identification tags to baggage handles. Photographs themselves are the only item that may be dispensed from the photo booths.

The prior art is thus characterized by several disadvantages that are addressed by the present invention. The present invention minimizes, and in some aspects eliminates, the above-mentioned failures, and other problems, by utilizing the methods and structural features described herein.

Thus, it would be an advancement in the art to provide a baggage identification tag that is easily produced and purchased, that includes a picture of the owner on the identification tag, and that can be reused repeatedly. It would be a further advantage to provide such a baggage identification tag that can be customized in a colorful and eye catching design so that the baggage identification tag is more easily identified. It would be an additional advantage to provide such a baggage identification tag that is made available all hours of the day and night at a location convenient for travelers to purchase. It would be yet a further advantage to provide a method for producing such an identification tag that allows the identification tags to be produced quickly without the assistance of a clerk or salesperson. It would be yet a further advantage to provide a method for providing baggage identification tags that allows identifying information to be placed on the tags in bold, clearly visible and legible writing, and that allows multiple tags to be created that are identical to each other.

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the invention will become apparent from a consideration of the subsequent detailed description presented in connection with the accompanying drawings in which.

DETAILED DESCRIPTION OF THE INVENTION

Figure 1:
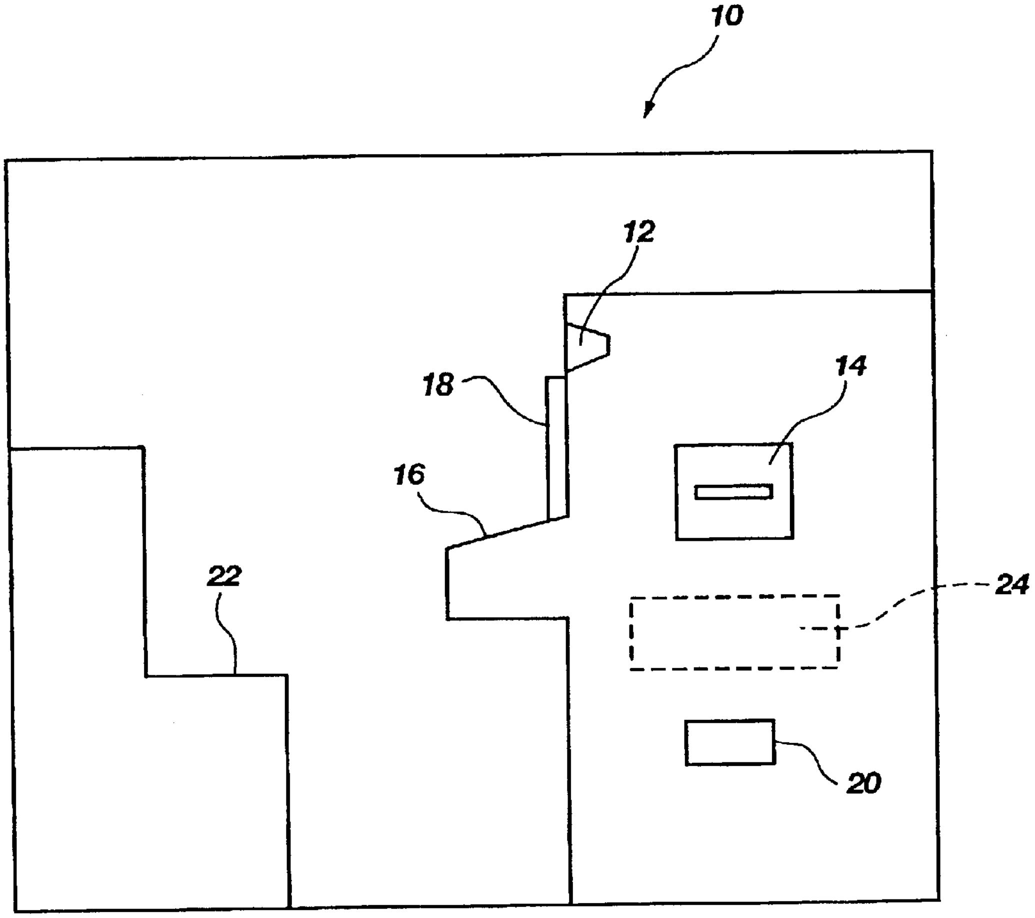
FIG. 1 is a schematic view of an apparatus for providing baggage identification tags.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

It must be noted that, as used in this specification and the appended claims, the singular forms "a," "an," and "the" include plural referents unless the context clearly dictates otherwise. Similarly, as used herein, the terms "comprising," "including," "containing," "characterized by," and grammatical equivalents thereof are inclusive or open-ended terms that do not exclude additional, unrecited elements or method steps.

Referring now to FIG. 1, a schematic view is shown of an apparatus or booth, indicated generally at 10, for providing baggage identification tags. It will be understood that the booth 10 may be formed in various different configurations and sizes within the scope of the present invention. The booth 10 may be formed as an enclosure having a door or curtain for providing privacy, or the booth 10 may be open such that an interior portion of the booth 10 is visible from outside the booth 10. The booth 10 may be configured to be installed at transportation stations, and other locations of high pedestrian traffic. The term transportation station, as used herein includes locations where travelers congregate, such as airports, bus terminals, and train stations for example. The booth 10 may also be installed at other locations, such as malls or other retail sales establishments, for example. Also, the booth 10 may be configured to be portable and the components of the booth 10 may be configured to be separated from each other. Alternatively, the booth 10 may be fixed in place with the components in fixed relationship with respect to each other.

The booth 10 may include photography means 12 for taking a picture. The photography means 12 may include any variety of cameras known in the art for taking pictures. For example, the photography means 12 may include a camera for taking still photographs using film or digital electronic technology. Also, the photography means 12 may include a type of video camera capable of taking moving pictures and allowing selection of a particular instant for printing or developing. The photography means 12 may be configured to take a still picture of a person or object in a picture taking zone. The photography means 12 may be concealed behind a reflective glass panel for protection. Moreover, the photography means 12 may be configured to allow a person to take a picture of him or herself without the assistance of another person. This allows the photography, means 12 to be operated conveniently and efficiently without the added cost and labor associated with a clerk or salesperson.

The booth 10 may also include means 14 for exchanging money. The money exchanging means 14 may include any of a variety of mechanisms known in the art for receiving money in various forms, such as cash, coins, or credit cards to operate the booth 10 and purchase items. The money exchanging means 14 may also include a mechanism for providing change and a receipt, as well as providing a display of the amount of money deposited. It will be understood that the money exchanging means 14 is depicted in schematic form in FIG. 1, and the money exchanging means 14 may be located in various different positions in the booth 10.

Figure 2:
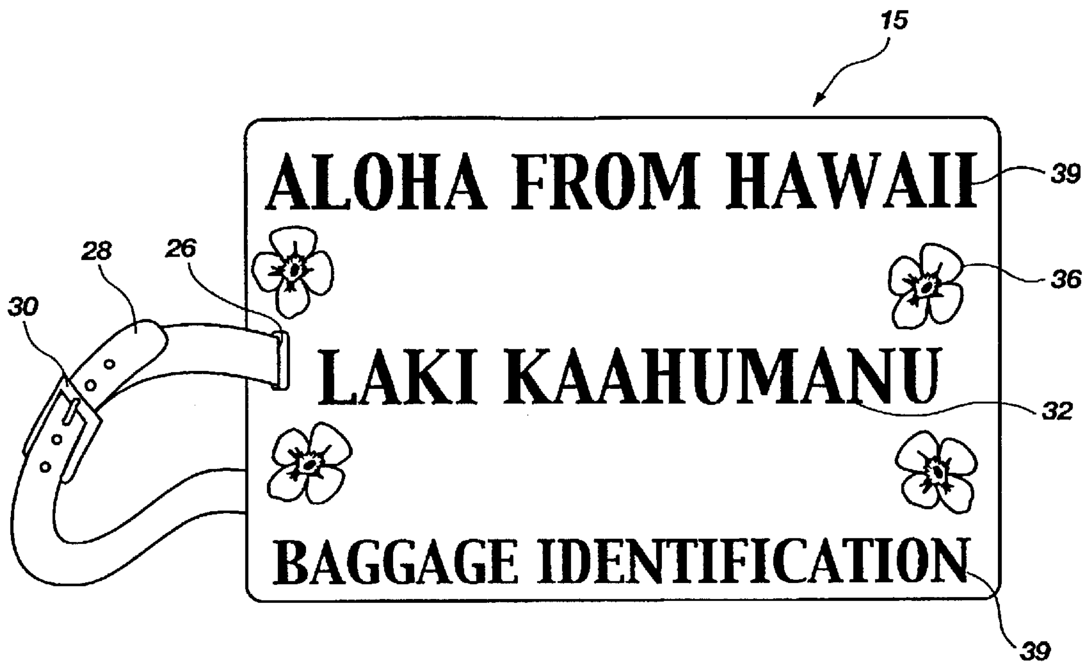
FIG. 2 is a front view of an exemplary baggage identification tag.
Figure 3:
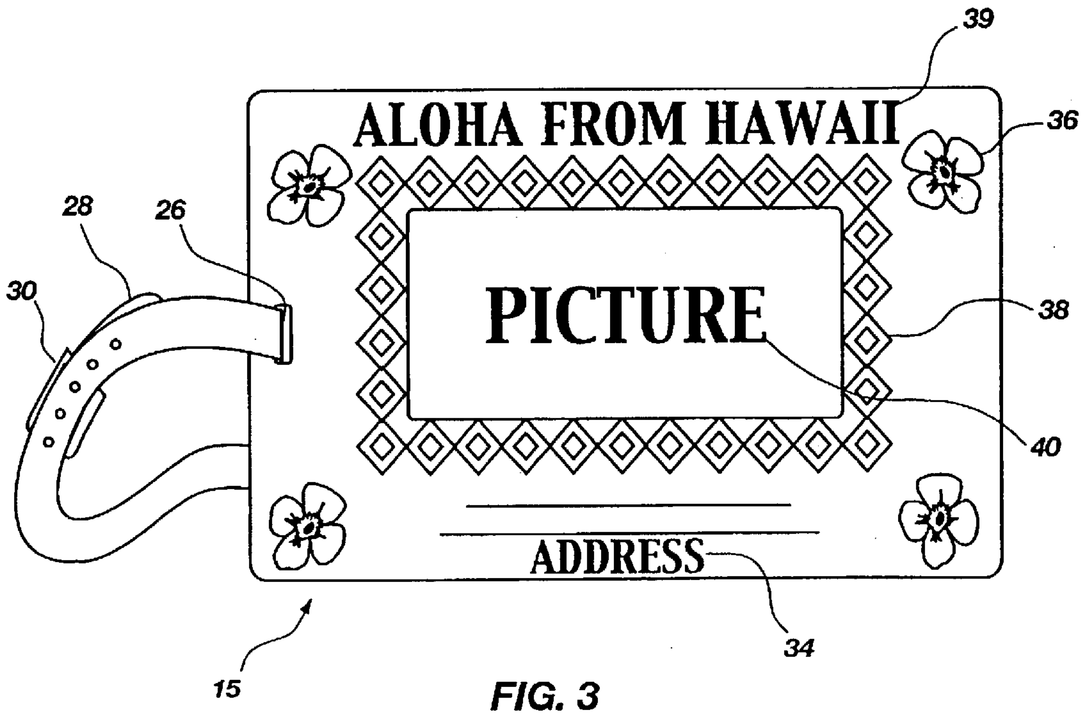
FIG. 3 is a back view of an exemplary baggage identification tag.

The booth 10 may also include input means 16. The input means 16 may be used for entering commands to operate the booth 10 and entering information, such as a name or address, to be included on an identification tag 15 as shown in FIGS. 2–3. The input means 16 may include a keyboard, keypad or any variety of buttons, knobs or switches to allow a user select available options provided in the booth 10, and to enter identifying information. It will be understood that the term "keyboard" as referred to herein includes a device including a number of mechanical buttons or keys which may be pressed to input characters, including letters and numbers, into the input means 16.

Display means 18 may also be provided in the booth 10 for providing information to a user of the booth 10. For example, the display means 18 may provide instructions for operating the booth 10 as well as options available to be incorporated on the identification tags. Moreover, the display means 18 may be used to show sample images or images obtained from the photography means 12. The display means 18 may be formed as a computer monitor or screen capable of depicting images based on electronic input. In another embodiment, the display means 18 may include instructions or images permanently depicted on the booth 10 without the use of an electronic device. It will be understood that any variety of visual depictions may be presented on the display means 18.

The booth 10 may also include dispensing means 20 for dispensing the identification tag 15. The dispensing means 20 may be formed in various different configurations and locations in the booth 10 within the scope of the present invention. For example, the dispensing means 20 may include a chute to allow the identification tag 15 to move under the force of gravity to be retrieved by the purchaser, as well as a receptacle for holding the identification tag 15. The receptacle may also have a cover to prevent access to the inner workings of the booth 10.

The dispensing means 20 may also include a mechanism for allowing the selection of one of a plurality of items or accessories for use with the identification tag 15. For example, the identification tag 15 may include a strap 28 that may be provided in various different styles, sizes and colors. The dispensing means 20 may be configured to allow a purchaser to select one or more of a plurality of the straps 28 that may be purchased. It will be understood that the dispensing means 20 may have numerous different compartments for the items or accessories and the items may be dispensed together with the identification tag 15 or separate from the identification tag 15.

The booth 10 may also include a seat 22 so that a person may be seated within the booth 10 to operate the booth and have his or her picture taken. The seat 22 may be formed integral with the booth 10 or it may be separable from the booth 10. The seat 22 may be adjustable so that a person can adjust the seat 22 to a desired position within a picture taking zone for taking a picture.

The booth 10 may include fabrication means 24, shown in dashed lines in FIG. 1, for placing pictures and other identification information on the identification tag 15. It will be understood that the term "identification information" as used herein includes customized information entered by a person that may be unique to the person to assist in identifying an object. Accordingly, an infinite number of different combinations of characters or indicia may be included in the identification information as devised by a person.

In one embodiment, the fabrication means 24 may include a computer for receiving, storing, and manipulating input from the input means 16. Also, the fabrication means 24 may include a mechanism for printing a picture and identification information on the identification tag 15. Alternatively, the fabrication means 24 may include a mechanism for affixing a picture to the identification tag 15. The fabrication means 24 may also include laminating means for covering a tag with a plastic covering to seal, protect and/or strengthen the identification tag 15. It will be understood that any variety of mechanism for placing images and indicia on a tag may be used as part of the fabrication means 24 within the scope of the present invention.

It will be appreciated that the booth 10 may include any combination of the features discussed above, and that not all of the features discussed above may be required for the booth 10 within the scope of the present invention.

Referring now to FIG. 2, a front view of an exemplary embodiment of the identification tag 15 is shown. The identification tag 15 may be formed in a rectangular shape or any other shape within the scope of the present invention. The identification tag 15 may include an opening 26 for receiving a strap 28. The strap 28 may be formed of a durable material, such as leather, metal, plastic, fabric, or elastic material, for example. Moreover, it will be appreciated that the strap 28 may be formed having various different colors, sizes and styles within the scope of the present invention. For example, the strap 28 may be formed as a chain or cord. Also, the strap 28 and may include an attachment mechanism, such as a buckle 30, so that the strap 28 may be removably attached to items such as a baggage handle. It will be understood that various different types of attachment mechanisms such as clasps, hook and loop connections, ties, or adhesives, for example, may be used within the scope of the present invention.

The identification tag 15 may include identifying or identification information, such as a name 32 and/or an address 34, as shown in FIG. 3, which shows a back view of an exemplary embodiment of the identification tag 15. It will be understood that the identifying information such as the name 32 and address 34 may be on either or both sides of the identification tag 15. The identifying information may include any variety of markings or indicia within the scope of the present invention.

The identifying information may be placed on the identification tag 15 in a manner to be clearly visible with bold letters. Placement of the identifying information with the fabrication means 24 allows the writing to be clear and legible thus improving the reliability of the identification tags 15. Moreover, the identification tags 15 may include decorative indicia 36, 38, and/or written indicia 39, and identifying colors that may be bright, eye catching colors that add to the attractiveness, identification characteristics, and noticeability of the identification tags 15. It will be understood that the identifying colors may include any color selected by a person to assist in distinguishing the identification tag 15. The decorative indicia 36, 38 may include any variety of figures such as flowers, patterns or other markings that add to the distinctiveness and aesthetic quality of the identification tags 15.

Also, the decorative indicia 36, 38 or written indicia 39 may include advertising information such as a company or product name, logo, trademark or service mark. Thus, the identification tags 15 may be used to promote any variety of goods and/or services. Accordingly, the identification tags 15 may be useful for business entities, such as airlines, and it may be desirable for such business entities to supply or operate a booth 10, or possibly support at least portion of the cost of the identification tags 15. The written indicia 39 may be automatically provided on the identification tags 15, or alternatively, the written indicia 39 may be selected from a plurality of options or entered/created by a person.

It will also be appreciated that the identifying information such as the name 32 and address 34 may be placed on the identification tags 15 using various different kinds of indicia or codes. Accordingly, it will be understood that the name 32 and address 34 as illustrated in FIGS. 2 and 3, are schematic only, and any variety of indicia or codes may be represented by the name 32 and the address 34. For example, in one embodiment of the identification tags 15, identifying information may be placed on the identification tags 15 in the form of bar codes. The bar codes may be of any variety known in the art, including a series of bars having different widths, in which different patterns of the bars represent different information. The bar codes may be placed on the identification tags 15 in addition to or in place of the written name and address. A scanning device, as known in the art, may be used to read the identification information represented by the bar codes. It will be understood that the scanning device may be located at any of a variety of locations, including at the booth 10 or at locations separate from the booth 10. For example, the scanning devices may be operated by airport baggage handlers or customer service representatives, to ensure that the baggage is handled and routed properly, and that the appropriate individual has possession of the baggage.

The identification tag 15 may be formed of various different materials, such as plastic, so as to be durable to withstand the wear encountered during travel. The identification tag 15 may thus be useful for repeated use and need not be replaced each time a person travels.

In use, the booth 10 may be placed in an area convenient for access by travelers, such as at an airport. A person may follow instructions for operating the booth 10 that may be displayed on the display means 18. The display means 18 may provide information such as instructions for inserting money into the money exchanging means 14; the cost for obtaining the identification tags 15; the background designs or decorative indicia 36 and colors available for the identification tags 15, and instructions for selecting a particular design; the sizes, styles and colors of straps 28 and other accessories available; optional font styles, sizes, colors and locations for the written identification information such as the name 32 and address 34 to be placed on the identification tags 15; instructions for taking a picture 40; and instructions for obtaining multiple identification tags 15, for example.

Figure 4:
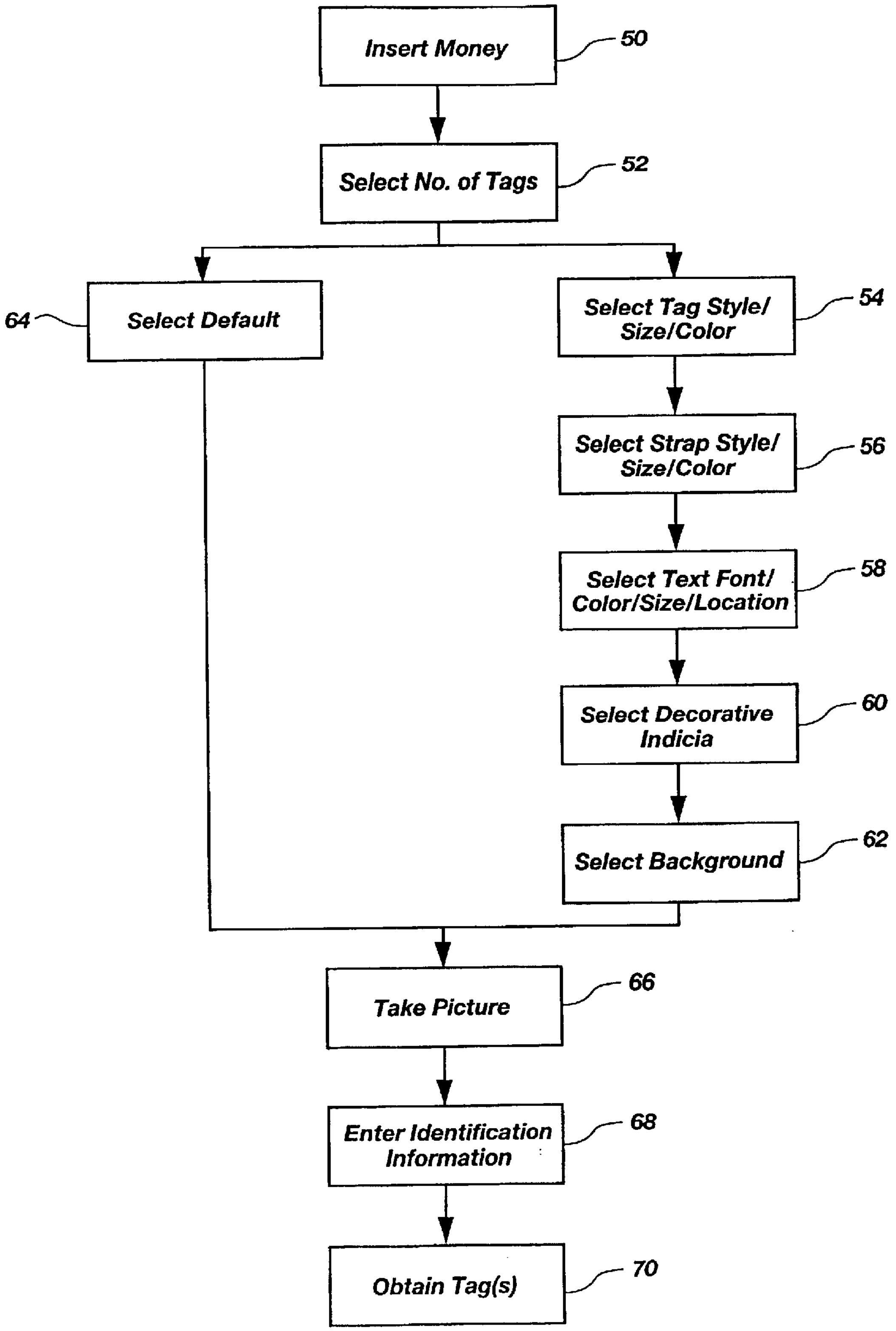
FIG. 4 is an exemplary flow chart showing possible method steps associated with the present invention.

Referring to FIG. 4, an exemplary flow chart is shown of some of the possible method steps associated with the present invention. It will be appreciated that not all of the steps shown in FIG. 4 may be required and that the order of the steps may be rearranged. Moreover additional steps may be included within the scope of the present invention.

The person may be positioned on the seat 22 to have a picture taken following the instructions on the display means 18. The person may insert money in the money exchanging means 14, in the form of cash, coins, or credit cards for example, as indicated by reference numeral 50. The person may select the number of identification tags 15 desired to be produced, as indicated at 52. The configuration of the identification tag 15 may be determined by selecting the desired style, size, color, and shape of the identification tag 15, as indicated at 54. Similarly, the person may select the desired style, size, and color of the strap 28, as indicated at 56. Moreover, the person may select the text font, color, size and location for the text to be placed on the identification tag 15, as indicated at 58. Also, the desired decorative indicia 36 may be selected from a variety of colors, patterns, and or figures, as depicted at 60, and a background for the picture may be selected 62. It will be appreciated that the booth 10 may be configured to provide a default selection 64 such that if a person does not want to choose between a variety of options, a standard identification tag 15 may be created, or a standard style, decorative indicia 36, color, font etc. may be provided.

The person may take a picture of him or herself, as indicated at 66, without the assistance of another person, at any time of the day or night for which the booth 10 is accessible. The person may also enter identification information such as a name 32 and address 34 to be placed on the identification tag 15, as indicated at 68. In one embodiment, the identification information may be entered using a keyboard. However, it will be appreciated that sound recognition mechanisms may also be utilized to allow the person to enter information verbally into the input means. Moreover, a mechanism may be provided wherein information, such as a name, from a credit card used to purchase the identification tag 15: may be automatically selected for placement on the identification tag 15.

A single identification tag 15 or a plurality of identification tags 15 may be obtained 70 at a single time, such that if multiple identification tags 15 are desired, they can be obtained in a quick and efficient manner. The plurality of identification tags 15 may be formed in an identical manner, or different identification tags 15 may be created using the same picture 40 and different decorative indicia 36. It will also be understood that different pictures 40 may be used with the same decorative indicia 36 such that a group of people may obtain a plurality of identification tags 15 each having different pictures 40, yet still having common decorative indicia 36. This may be particularly helpful for families or groups that may be traveling together to identify baggage that belongs to the group.

In one embodiment, the identification tag 15 may be dispensed with the strap 28 already attached. In another embodiment, the identification tag 15 may be provided separately from the strap 28. In this embodiment, the strap may be inserted through the opening 26 and fastened around a baggage handle. It will be understood that the straps 28 may be attached to the identification tag 15 using various different mechanisms, such as using clips or fasteners for example. Also, embodiments of the identification tag 15 are possible, within the scope of the present invention, in which the strap 28 may be formed integral with the identification tag 15, or in which the identification tag 15 may not include a strap at all.

It will be appreciated that the structure and apparatus disclosed herein is merely one example of a photography means, money exchanging means, input means, display means, dispensing means, and fabricating means, and it should be appreciated that any structure, apparatus or system which performs functions the same as, or equivalent to, those disclosed herein are intended to fall within the scope of a photography means, money exchanging means, input means, display means, dispensing means, and fabricating means, including those structures, apparatus or systems which are presently known, or which may become available in the future. Anything which functions the same as, or equivalently to, a photography means, money exchanging means, input means, display means, dispensing means, and fabricating means, falls within the scope of these elements.

In accordance with the features and combinations described above, a useful method of providing baggage identification tags includes the steps of:

(a) placing photography means at a transportation station, the photography means being configured for allowing a person to take a picture of the person without the assistance of another person;

(b) providing display means for displaying information to the person;

(c) providing input means for allowing the person to enter identification information to be placed on the identification tags;

(d) providing money exchanging means for allowing the person to purchase the identification tags;

(e) providing fabrication means for placing the picture and identification information on the identification tags; and (f) providing dispensing means for dispensing the identification tags and straps to attach the identification tags to a baggage handle.

Those having ordinary skill in the relevant art will appreciate the advantages provide by the features of the present invention. For example, it is a feature of the present invention to provide a baggage identification tag that is easily produced and purchased, and that includes a picture of the owner on the identification tag. It is a further feature of the present invention to provide such a baggage identification tag that can be customized in a colorful and eye catching design so that the baggage identification tag is more easily identified. It is an additional feature to provide such a baggage identification tag that is made available all hours of the day and night at a location convenient for travelers to purchase. It is yet a further feature to provide a method for producing such an identification tag that allows the identification tags to be produced quickly without the assistance of a clerk or salesperson. It is still a further feature to provide a method for providing baggage identification tags that allows identifying information to be placed on the tags in bold, clearly visible and legible writing, and that allows multiple tags to be created that are identical to each other.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for providing baggage identification tags comprising:

photography means for allowing a person to take a picture of the person without the assistance of another person;

money exchanging means for receiving money into the apparatus to allow said person to purchase said baggage identification tags;

input means for allowing said person to enter identification information to be placed on said identification tags;

display means for providing information to said person;

fabrication means for placing said picture and identification information on the identification tag; and dispensing means for dispensing the identification tag to the person.

2. The apparatus of claim 1, wherein said input means comprises a keyboard for allowing the person to enter a name and address to be placed on said identification tags.

3. The apparatus of claim 1, wherein the dispensing means is configured to dispense a strap for attaching the identification tag to a baggage handle.

4. The apparatus: of claim 1, wherein the fabrication means is further configured for forming said identification tags with identifying colors and decorative indicia.

5. The apparatus of claim 1, wherein said input means comprises a keyboard for allowing the person to enter a name and address to be placed on said identification tags;

wherein the dispensing means is configured to dispense a strap for attaching the identification tag to a baggage handle;

wherein the fabrication means is further configured for forming said identification tags with identifying colors and decorative indicia; and and wherein the apparatus further comprises a seat for allowing said person to be positioned in a picture taking zone.

6. A method for providing baggage identification tags, said baggage identification tags having straps for attaching said baggage identification tags to baggage, said method comprising the steps of:

(a) providing photography means for allowing a person to take a picture of the person without the assistance of another person;

(b) providing input means for allowing the person to enter identification information to be placed on the identification tags;

(c) providing money exchanging means for allowing the person to purchase the identification tags;

(d) providing fabrication means for placing the picture and identification information on the identification tags; and (e) providing dispensing means for dispensing the identification tags and straps.

7. The method of claim 6, further comprising the step of providing display means for displaying information to the person.

8. The method of claim 6, further comprising the step of providing an option to select from a plurality of styles of baggage identification tags.

9. The method of claim 6, further comprising the step of providing an option to select from a plurality of styles of straps.

10. The method of claim 6, further comprising the step of providing an option to select from a plurality of decorative indicia to be placed on the identification tags.

11. The method of claim 6, further comprising the step of providing an option to select from a plurality of available identifying colors for placing on the identification tag.

12. The method of claim 6, further comprising the step of providing an option to select a font to be used for the identification information placed on the identification tag.

13. The method of claim 6, further comprising providing said photography means, input means, money exchanging means, fabrication means and dispensing means as part of a booth.

14. The method of claim 6, further comprising providing an option to select the number of identification tags to be purchased.

15. The method of claim 6, further comprising providing an option to select a default decorative indicia, color, and identification information font to be placed on the identification tags.

16. The method of claim 6, further comprising placing advertising information on the identification tags to promote goods or services.

17. The method of claim 6, further comprising attaching one of the identification tags to a baggage handle.

18. The method of claim 17, further comprising utilizing the identification tag repeatedly while traveling on a plurality of trips.

19. The method of claim 6, further comprising the steps of:

providing display means for displaying information to the person;

configuring said photography means, said input means, said money exchanging means, said dispensing means and said display means as part of a booth, and placing said booth at a transportation station;

providing an option to select from a plurality of styles of baggage identification tags;

providing an option to select from a plurality of styles of straps;

providing an option to select from a plurality of decorative indicia to be placed on the identification tags;

providing an option to select from a plurality of available identifying colors for placing on the identification tag;

providing an option to select a font to be used for the identification information placed on the identification tags;

providing an option to select the number of identification tags to be purchased;

providing an option to select a default decorative indicia, color, and identification information font to be placed on the identification tags;

offering the identification tags to be purchased at any time without the assistance of another person.

20. A baggage identification tag system, said system comprising:

photography means for allowing a person to take a picture of the person without the assistance of another person;

money exchanging means for receiving money;

input means for entering identification information;

display means for providing information to said person;

fabrication means for placing said picture and identification information on an identification tag; and at least one identification tag, wherein said at least one identification tag comprises a strap for attaching said at least one identification tag to a baggage handle.

21. The system of claim 20, further comprising dispensing means for dispensing the at least one identification tag.

22. The system of claim 20, wherein said at least one identification tag comprises an opening for receiving the strap.

23. The system of claim 20, wherein said strap comprises a buckle to allow said strap to be removably attached to a baggage handle.

24. The system of claim 20, wherein said at least one identification tag comprises decorative indicia.

25. The system of claim 24, wherein said decorative indicia comprises an identifying color to facilitate identification of said identification tag.

26. The system of claim 20, wherein said at least one identification tag comprises a picture of said person.

27. The system of claim 20, wherein said identification information comprises a name and an address, and wherein said identification information is placed on said at least one identification tag.

28. The system of claim 21, wherein the photography means, the money exchanging means, the input means, the display means, the fabrication means and the dispensing means are configured together as part of a booth.

29. The system of claim 20, further comprising dispensing means for dispensing the at least one identification tag, wherein the dispensing means is configured to dispense said strap for attaching the identification tag to a baggage handle;

wherein the photography means, the money exchanging means, the input means, the display means, the fabrication means and the dispensing means are configured together as part of a booth;

wherein said at least one identification tag comprises an opening for receiving the strap;

wherein said strap comprises a buckle to allow said strap to be removably attached to a baggage handle;

wherein said at least one identification tag comprises decorative indicia;

wherein said decorative indicia comprises an identifying color to facilitate identification of said identification tag;

wherein said at least one identification tag comprises a picture of said person;

wherein said identification information comprises a name and an address, and wherein said identification information is placed on said at least one identification tag.

30. The system of claim 20, wherein said identification information comprises a bar code.

* * * * *